Sept. 24, 1935.  M. H. MARTINDELL  2,015,647
MOLDING APPARATUS
Filed Feb. 24, 1933   6 Sheets-Sheet 1

Inventor:
Milton H. Martindell
By his Attorneys
Howson & Howson

Sept. 24, 1935. M. H. MARTINDELL 2,015,647
MOLDING APPARATUS
Filed Feb. 24, 1933 6 Sheets-Sheet 2
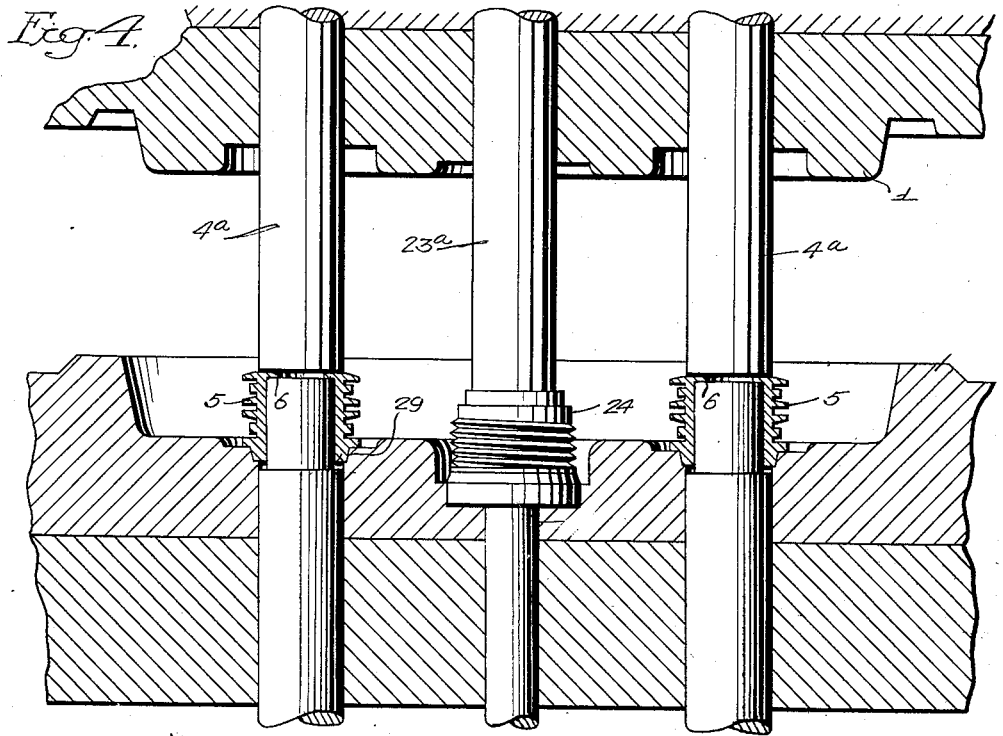
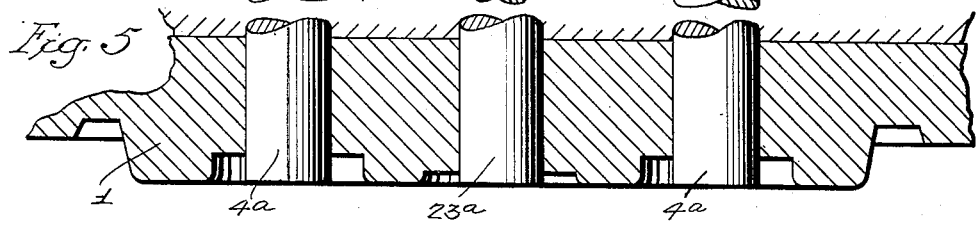
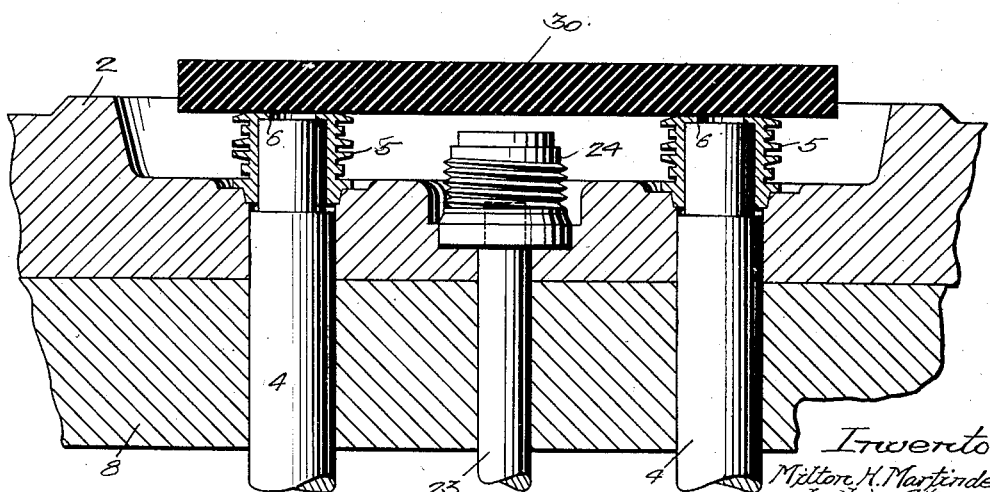
Inventor:
Milton H. Martindell
by his Attorneys
Howson & Howson Sept. 24, 1935.  M. H. MARTINDELL  2,015,647
MOLDING APPARATUS
Filed Feb. 24, 1933   6 Sheets-Sheet 3
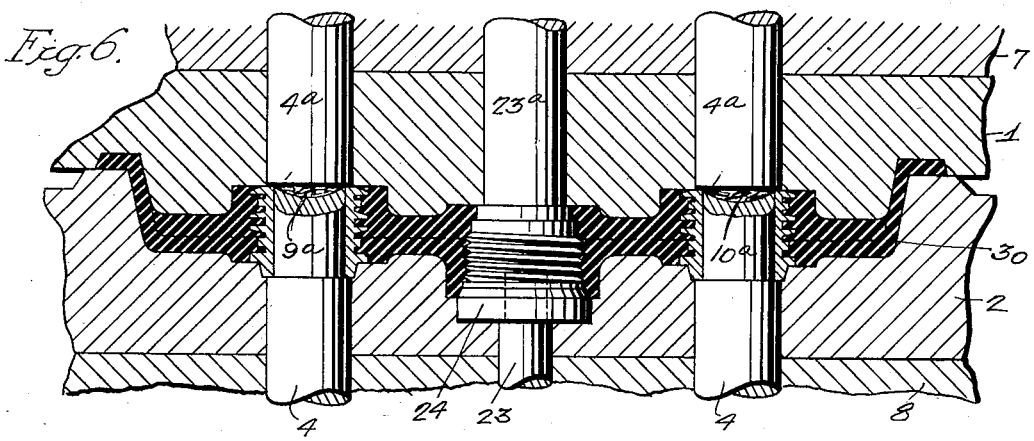
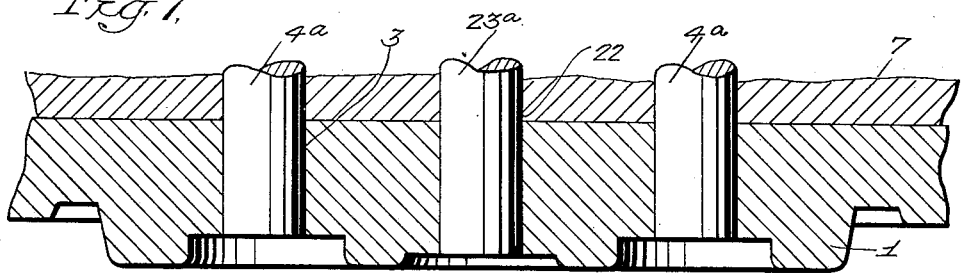
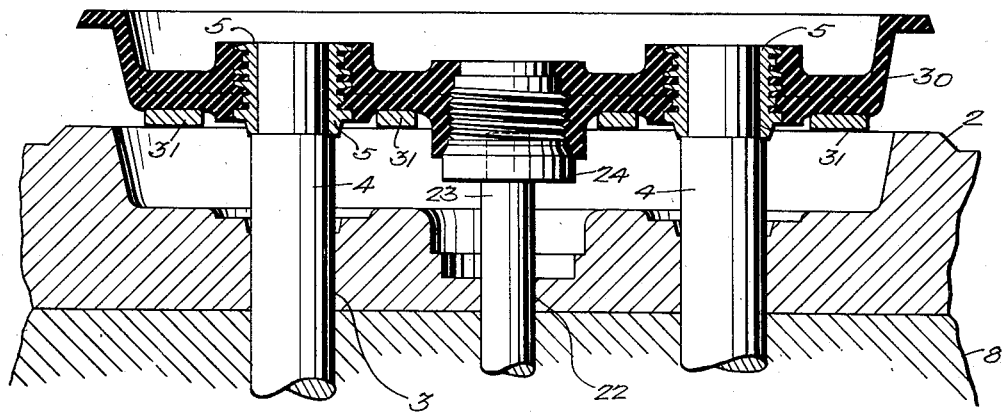
Inventor:
Milton H. Martindell
by his Attorneys
Howson & Howson Sept. 24, 1935.  M. H. MARTINDELL  2,015,647
MOLDING APPARATUS
Filed Feb. 24, 1933   6 Sheets-Sheet 4

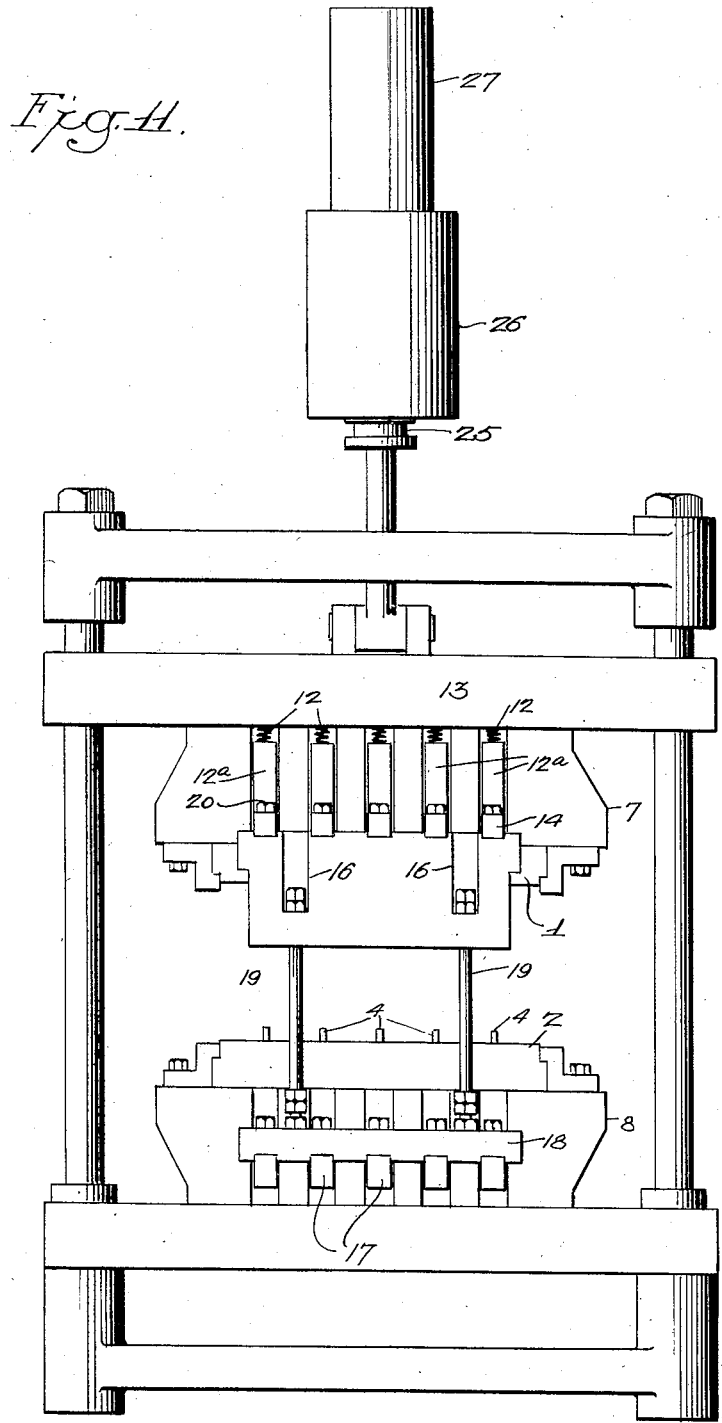

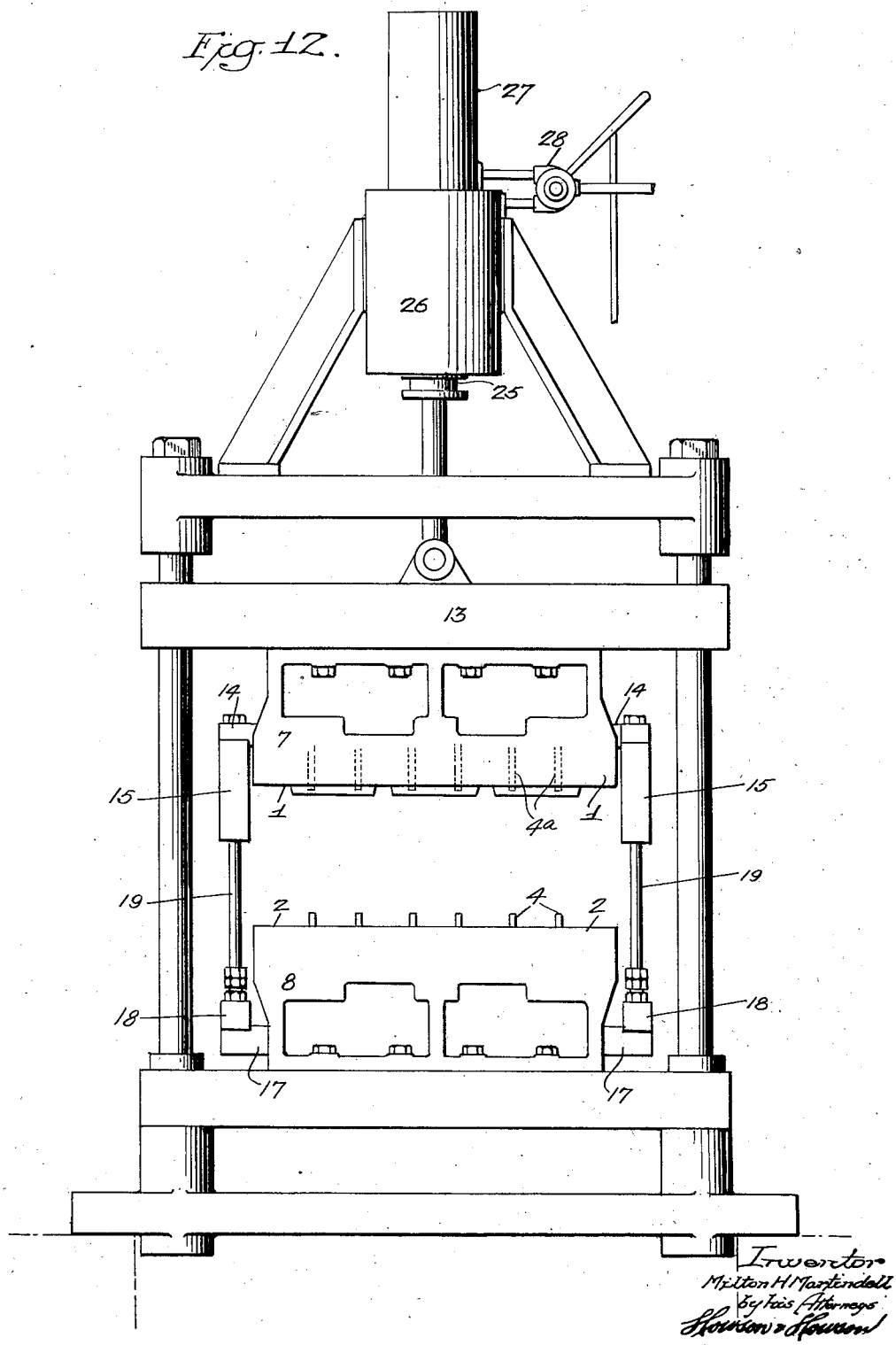

Patented Sept. 24, 1935

2,015,647

UNITED STATES PATENT OFFICE 2,015,647

MOLDING APPARATUS

Milton H. Martindell, Trenton, N. J., assignor to Jos. Stokes Rubber Company, Trenton, N. J., a corporation of New Jersey Application February 24, 1933, Serial No. 658,415

11 Claims. (Cl. 18—17)

This invention relates to a novel apparatus for molding hard rubber or composition box covers for wet cell batteries and the like, and has particular relation to apparatus for making battery box covers of the character described having terminal post bushings molded integral therewith in bonded relation.

The apparatus hereinafter described relates primarily to the molding of battery box covers of rubber or other composition having metal terminal bushings of the character described in the copending application of Milton H. Martindell, filed Nov. 3rd, 1932, and bearing Ser. No. 641,081.

The principal object of the invention is to provide an apparatus for molding battery box covers of the stated character having metal terminal bushing wherein the rubber or composition material of the cover is bonded securely about said bushings for the purpose of preventing leakage of electrolytic liquid between the bushing wall and the cover proper.

Another object of the invention is to provide a molding apparatus of the character set forth wherein the battery terminal bushings and the annular flange are sheared for the reception of the terminal posts during molding of the cover material into bonded relation with said bushings.

A more specific object of the invention is to provide a molding apparatus of the character set forth, having a spindle for supporting the bushings during said molding process and including a cutting edge at the upper extremity thereof to ream the bushing for reception of the terminal post.

Other features and details of the invention relating both to the particular apparatus and the process performed thereby, are set forth in detail hereinafter and disclosed in the accompanying drawings in which:

Fig. 4 is a diagrammatic view in section of a portion of the molding apparatus showing the terminal bushings and the water port bushing positioned therein;

Fig. 5 is a view similar to the disclosure of Fig. 4, wherein the upper mold plate has been retracted and a piece of stock positioned in the mold ready to be molded;

Fig. 6 is a view similar to the disclosure in Fig. 4, showing the relation of the respective parts of the apparatus during the actual molding and formation of the cover, the flanges having been sheared off by the spindles;

Fig. 7 is a view similar to Fig. 4, showing the relative positions of the parts of the apparatus when removing the molded cover therefrom;

Fig. 11 is a diagrammatic side view of a mold press operative to actuate the molds and spindles in accordance with the invention; and Fig. 12 is a view similar to Fig. 11 of the front of the mold press.

Figure 1:
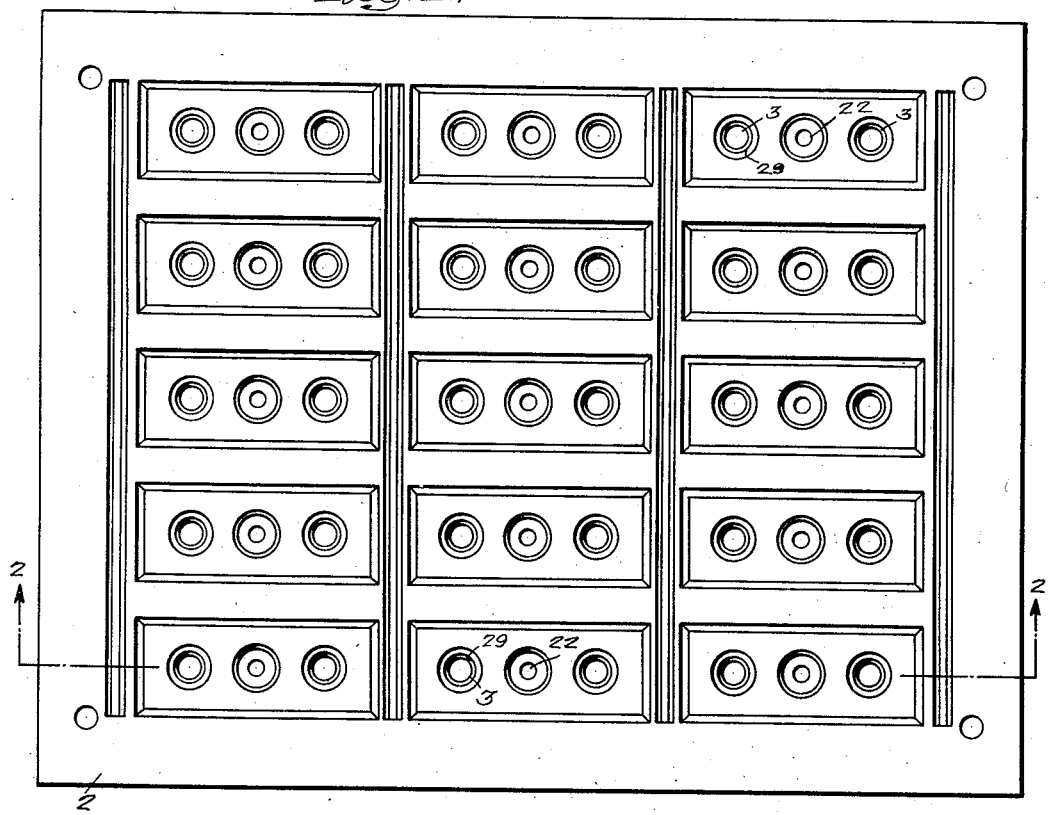
Figure 1 is a view in plan of the lower or bottom mold plate.
Figure 2:
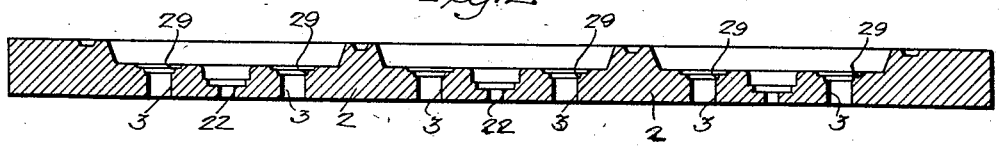
Fig. 2 is a view in section on line 2—2, Fig. 1.
Figure 3:
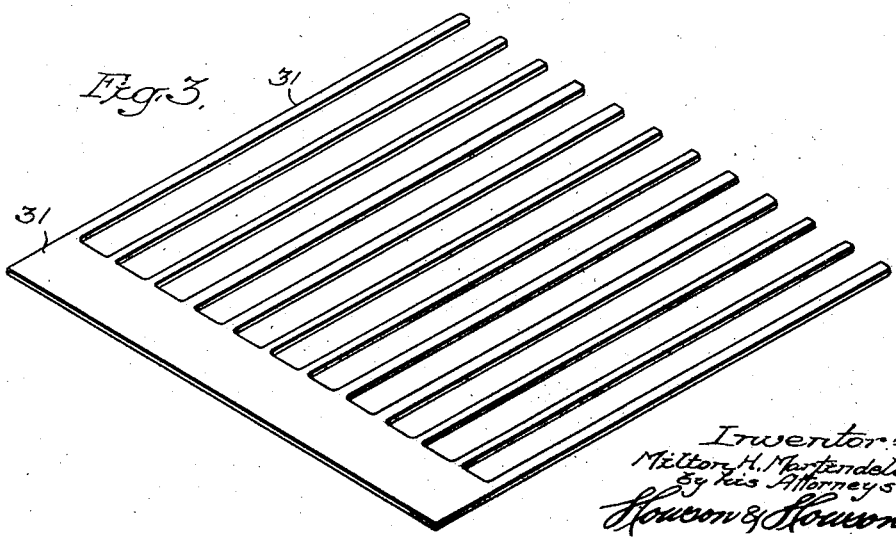
Fig. 3 is a view in perspective of a tray having projecting spaced parallel fingers thereon for use in removing the molded battery box covers from the mold.
Figure 8:
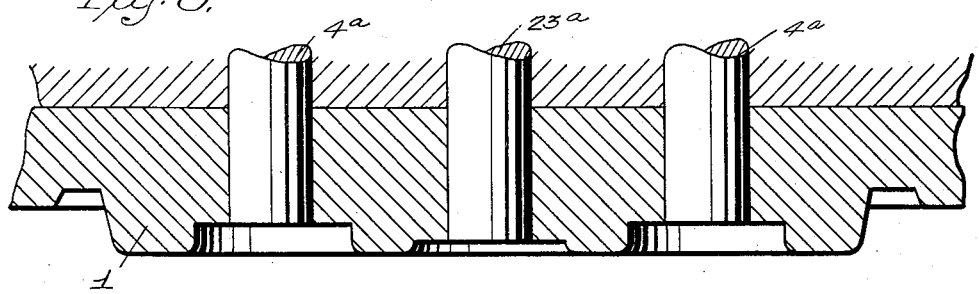
Fig. 8 is a view similar to the disclosure in Fig. 7 wherein the supporting spindles for the bushings and the center port have been lowered or withdrawn from the bushings, leaving the finished cover free to be removed from the apparatus.

Referring now more particularly to the drawings, the mold or die of which the present invention is comprised, includes upper and lower mold plates 1 and 2 respectively which have complementary cut-out portions designed to meet the particular form of battery box cover desired. The mold plates 1 and 2 are provided with aligned vertical apertures 3 in which are slidably mounted the complementary and oppositely acting spindles 4 and 4a, the former constituting supporting guides for battery terminal bushings 5 to maintain the latter in proper position during the process of molding the battery box cover thereabout. Steam jackets or plates 7 and 8 are secured to the upper and lower surfaces of the upper and lower mold plates 1 and 2 respectively and function to heat said mold plates to a temperature great enough to substantially liquefy the rubber or composition material and enable said material to flow into every niche and corner of the space intermediate the complementary mold plates during the time allotted for the molding of the covers.

As has been previously described in the aforementioned copending application of Milton H. Martindell, bearing Serial No. 641,081, the terminal bushings 5 are cast with an inwardly projecting flange or web 6 to exclude as much of the moldable material as is possible from the interior thereof and are not of such internal finish as to be ready at all times to receive the terminal posts.

Figure 9:
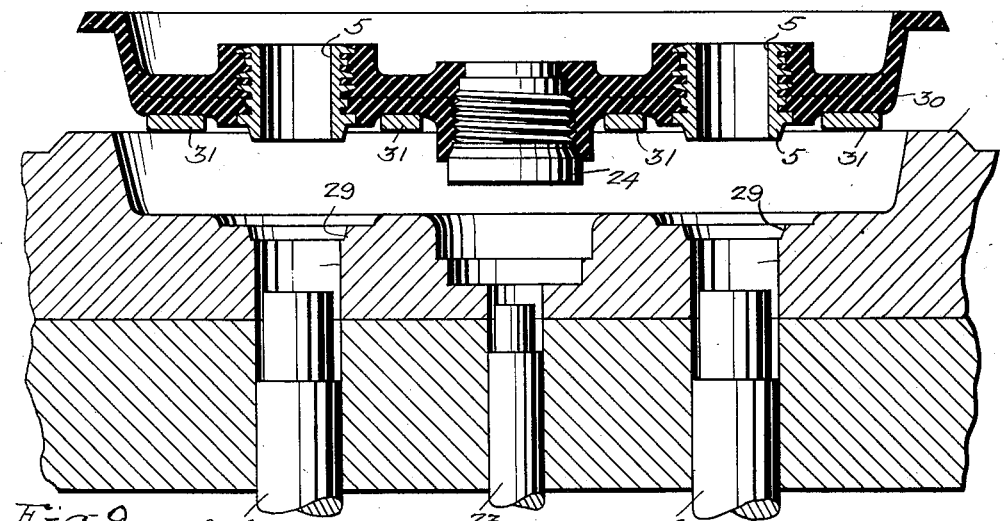
Fig. 9 is a fragmentary view in section showing the relation of the cooperating bushing spindles prior to shearing off the flanges of said bushings.

For the purpose of shearing the internal bore of the bushing 5 and shearing off the inwardly projecting flange 6 therefrom, the spindles 4a in the present instance are provided with a concave lower end surface 9 terminating in a cutting edge 10 at the circumference thereof, the said cutting edge 10 operating against the opposed or abutting upper end face of the bushing spindles 4 in the lower mold plate. The upper plate spindles 4a are formed with a concavity 11 for the purpose of providing a sufficient receptacle to receive the shavings and sheared flange portion from the internal bore of the bushing 5 so that any possibility of a jam occurring between the cooperating opposed spindles 4 and 4a will be entirely eliminated. See Figs. 9 and 10 of the drawings.

A particular feature of the invention resides in the novel mounting of the spindle 4 and 4a and as previously set forth, these spindles 4a are slidably mounted in the vertical bores 3 of the upper mold plate 1 and in the present instance are compressible against the action of springs 12, the upper ends of which abut against the under side of the supporting platen 13. The springs 12 are slidably mounted within sleeves 12a, the lower ends of which abut against the upper surface of cross bars 14 to which the upper ends of the spindles 4a are attached. In the present instance the cross bars 14 extend beyond the sides of the top mold assembly and a downwardly extending top cross head 15 is secured to the ends thereof. The top cross head 15 is provided with open ended slots 16 which extend downwardly therein from the upper edge of said member. The lower plate spindles 4 are mounted upon and project upwardly from cross bars 17, the ends of which extend beyond the lower mold assembly and are secured to a bottom cross head 18. A pair of pull rods 19 are secured to the bottom cross heads 18, as shown in Figs. 11 and 12 and extend vertically upward therefrom the upper portions being slidably mounted in the top cross heads 15 and terminating in the vertical slots 16 as shown. Lock nuts 20 are threaded on the end thereof to provide an abutment for engagement by the shoulder formed by the bottom face of said slots 16 as shown in Fig. 11, the purpose for which will be set forth hereinafter.

The upper and lower mold plates 1 and 2 are further provided with aligned apertures 22 having opposed spindles 23 and 23a slidably mounted therein for the purpose of firmly and securely positioning the water or electrolytic liquid port core 24 during the molding of the box cover. These spindles 23 and 23a are mounted in a manner similar to that described in connection with the bushing spindles 4 and 4a and are operable in a manner substantially the same as and simultaneous with the said spindles 4 and 4a as will be described in detail hereinafter. While in the present embodiment the spindles 23 and 23a are so mounted, it should be pointed out at this time that said spindles need not be so mounted to insure efficient carrying out of the process.

Provision is made for actuating the top mold plate 1 as may be desired, in order to efficiently carry out the successive steps in the molding process. In the present instance movement of the mold plate 1 is effected by means of a steam or other pressure actuated piston rod 25 operating within steam cylinders 26 and 27, the former moving the mold plate downward and the latter functioning as a return cylinder to lift same. The flow of steam or other fluid to the two cylinders 26 and 27 is controlled by a two-way valve 28.

In operation of the molding apparatus to carry out the successive steps of the molding process through a complete cycle, it is necessary that steam be allowed to flow through each of the steam jackets or plates 7 and 8, a sufficient time to heat the mold plates 1 and 2 to the temperature required to melt the rubber or other composition stock. The top mold plate 1 and its supporting assembly is raised to afford sufficient clearance space for the positioning of the bushings 5, and it should be particularly noted that the top mold assembly is not raised too great a distance so that the shoulders formed by the bottoms of the slots 16 engage the lock nuts 20 and raise the pull rods 19 which act through the cross head 18 and cross bars 17 to raise the lower spindles 4 with respect to the bottom mold plate, but will remain in their normal position with respect to said plate as shown in Figs. 4 and 5. The terminal bushings 5 and the water port core 24 for each cover, are positioned on the lower spindles 4 and 23 respectively as shown in Fig. 5 of the drawings. The bushings 5 are inserted upside down in the lower mold plate 2 and the extended side wall thereof, is arranged to be inserted in an offset 29 in said lower plate 2 as shown in Fig. 4 of the drawings in order to insure proper seating of the bushings to provide a seal between the cavity of the mold plate 2 and the spindle bores therein and prevent leakage of the rubber or composition into the latter.

The top mold assembly is then slowly lowered until the lower faces of the spring-projected upper spindles 4a and 23a contact with the upper surface of the bushings 5 and water port core 24 to firmly seat the latter in the lower mold plate as shown in Fig. 4 of the drawings. The upper mold assembly is then raised to its initial position to afford sufficient space between said plates and spindles so that blocks 30 of rubber or other composition, may be positioned as shown in Fig. 5 to be molded into battery box jar covers about the bushings 5 and cores 24.

When the pieces of material or stock 30 to be molded have been distributed in the manner shown, the upper mold plate is actuated downwardly by permitting steam or compressed air to enter the cylinder 26. As the upper mold plate 1 nears the lower mold plate 2 and the blocks of stock 30, the spindles 4a and 23a first engage said block of stock and as the top plate assembly continues to move in a downward direction, the abutment afforded said spindles by the stock 30, compresses them against the springs 12 and they remain stationary temporarily while the top plate assembly moves further toward the lower plate. Obviously the springs 12 exert a constant outward force on the spindles 4a and 23a and immediately the stock 30 begins to melt due to the heat afforded by the steam jackets or plates 7 and 8, said springs 12 force the spindles 4a and 23a downwardly until they reach the position shown in Fig. 9 of the drawings with the cutting edge 10 just contacting with the bushings 5. At this point the top mold plate has not yet been fully seated with respect to the lower mold plate, and as this final downward movement of the top plate into contact with the bottom plate, the bottom face of the platen 13 of the top mold assembly engages the upper edge of the spring sleeves 12a and actuates the spindles 4a the small distance required to shear off the flanges in the upper end of the bore of the bushings 5 as shown in Fig. 10 of the drawings.

Figure 10:
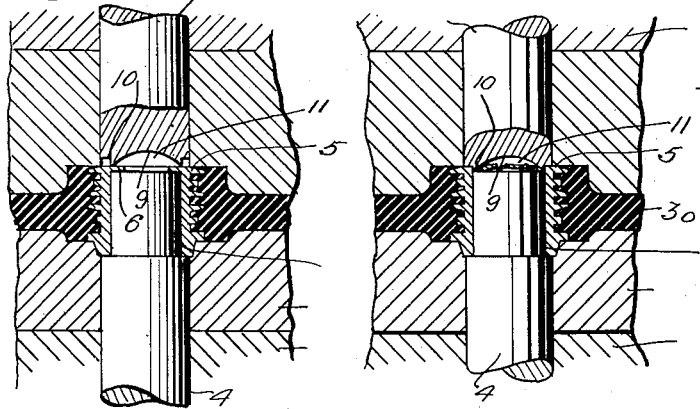
Fig. 10 is a view similar to Fig. 9 showing the relation of the spindles after the shearing operation.

In order to insure the proper molding of the box covers and provide a perfect bond or seal between said cover material and the surface wall of the bushings, it is desirable that the apparatus be allowed to stand in the last described relation shown in Figs. 6 and 10 for a length of time which is arrived at or determined, depending upon the particular material to be molded or other factors which are a matter of experiment. When sufficient time has elapsed for the molding operation to be completed, the top mold assembly is elevated by admitting steam or other fluid under pressure to return cylinder 27. As the top plate rises away from the lower mold assembly, the springs 12 tend to expand and project the spindles 4a and 23a downwardly with respect to the vertical upward movement of the top plate. This action of the spindle springs causes the spindles to remain seated upon the molded cover in the relation shown in Fig. 10 so that the said cover will not rise with the top plate but will remain in the lower mold plate. However, movement of the top mold assembly a sufficient distance upward beyond the limit of expansion of the springs 12 releases the spindles from contact with the bushings 5 and further upward movement of the top plate lifts the spindles out of engagement of the molded cover which remains in the lower mold plate.

As further movement upward of the top mold assembly continues, the shoulder afforded by the lower end surface of the slots 20 in the top cross heads engages the lock nuts 21 on the upper ends of the pull rods 19, thus raising said pull rods which act through the bottom cross heads 18 and cross bars 17 to lift the lower spindles 4 and 23 thus elevating the molded cover to the position shown in Fig. 7 of the drawings out of the lower mold plate and sufficiently above the latter so that the parallel arms 31 of a removing tray 32 may be inserted therebetween for the purpose of supporting the finished covers clear of said mold plate 2.

With the finished molded article thus supported on the tray 32, the top mold assembly is lowered, thus permitting the pull rods 19 to be correspondingly lowered to reposition the spindles 4 and 23 in their normal position shown in Fig. 4 of the drawings ready for the next molding operation. When the finished covers have been removed as described, the port cores 24 may be readily removed therefrom by unscrewing said cores from engagement with the corresponding threads molded in the water port wall.

A modified form of the cooperating bushing spindles 4 and 4a is disclosed in Fig. 6 of the drawings, wherein the lower spindle 4 is provided with a concave upper end surface 9a having a hardened cutting edge at 10a at its periphery and the lower end face of the upper spindle 4a is provided with a flat surface which comprises an abutting surface against which the shearing of the flange or web 6 from the bushing takes place.

Operation of the apparatus to shear the bushing web 6 when employing spindles of the modified form, is substantially the same as has been set forth in connection with the preferred form, the only difference being that the final upward movement of the lower spindles 4 to shear the bushing flange 6 against the adjacent surface of the upper spindles 4a is effected by means of a piston rod operating within a steam or other compressed fluid piston (not shown) which is mounted below the press.

In the modified arrangement just noted, the connection afforded by the pull rods 19 and the upper and lower cross heads 15 and 18, is not necessary and may be eliminated from the apparatus.

Successive moldings of the battery box covers are carried out in the manner herein set forth for the purpose of description, but it is not intended that the apparatus be limited thereto within the scope of the annexed claims.

What is claimed is:

1. In apparatus for molding battery box cover members having terminal post bushings therein initially provided with protective webs overlying at least a portion of the bushing bore, a top and bottom mold plate having complementary recesses therein and movable relatively with respect to each other, a set of spindles slidably mounted in one of said mold plates and arranged to abut the adjacent face of the protective webs of the bushings, another set of spindles slidably mounted in the other mold plate, said spindles each having a cutting edge at the periphery of their ends, and means operable during the molding operation to actuate the second set of spindles and cause the cutting edge to shear the protective webs from said bushings against the abutment afforded by the first set of spindles and form openings in the bushings of substantially the same diameter as the bore for the reception of terminal posts.

2. In apparatus for molding battery box cover members having terminal post bushings therein initially provided with protective webs overlying at least a portion of the bushing bore, a top and bottom mold plate having complementary recesses therein and movable relatively with respect to each other, a set of spindles slidably mounted in one of said mold plates and arranged to abut the adjacent face of the protective webs of the bushings, another set of spindles slidably mounted in the other mold plate, said spindles each having a cutting edge at the periphery of their ends, and means operable during the molding operation to actuate the second set of spindles and cause the cutting edge to shear the protective webs from said bushings against the abutment afforded by the first set of spindles and form openings in the bushings of substantially the same diameter as the bore for the reception of terminal posts, the ends of at least one of said sets of spindles being concave to provide sufficient space to receive the portions of the web sheared from said bushings.

3. In apparatus for molding battery box cover members having terminal post bushings therein initially provided with protective webs overlying at least a portion of the bushing bore, a top and bottom mold plate having complementary recesses therein and movable relatively with respect to each other, a set of spindles slidably mounted in one of said mold plates and arranged to abut the adjacent face of the protective webs of the bushings, another set of spindles slidably mounted in the other mold plate and aligned with the spindles of the other set, said spindles each having a cutting edge at the periphery of their ends, and means operable during the molding operation to actuate the second set of spindles and cause the cutting edge to shear the protective webs from said bushings against the abutment afforded by the first set of spindles and form openings in the bushings of substantially the same diameter as the bore for the reception of terminal posts, the ends of at least one set of spindles being concave to provide sufficient clearance between the ends of the aligned spindles to receive the portions of the web sheared from the bushing.

4. In apparatus for molding battery box cover members having terminal post bushings therein initially provided with a protective web, complementary mold plates movable relatively with respect to each other, a set of bushing spindles slidably mounted in each of said mold plates, the spindles of one of said sets having a cutting edge, means operable to move the mold plates together for molding, means operable to vary the relative position of the sets of spindles with respect to the mold plates and each other to shear the protective webs from the bushings, and means operable to relatively separate the mold plates at the completion of the molding operation independently of the spindles.

5. In apparatus for molding battery box cover members having terminal post bushings therein initially provided with a protective web, complementary mold plates movable relatively with respect to each other, a set of bushing spindles slidably mounted in each of said mold plates, the spindles of one of said sets having a cutting edge, means operable to move the mold plates together for molding, means operable to vary the relative position of the sets of spindles with respect to the mold plates and each other to shear the protective webs from the bushings, means operable to withdraw one of the mold plates at the completion of the molding operation independently of the spindles, and means associated with said mold plate operable to withdraw the spindles mounted therein from the molded cover at a predetermined time after withdrawal of the mold plate.

6. In apparatus for molding battery box cover members having terminal post bushings therein initially provided with a protective web, complementary mold plates movable relatively with respect to each other, a set of bushing spindles slidably mounted in each of said mold plates, the spindles of one of said sets having a cutting edge, means operable to move the mold plates together for molding, means operable to vary the relative position of the sets of spindles with respect to the mold plates and each other to shear the protective webs from the bushings, means operable to withdraw one of the mold plates after completion of the molding operation independently of the spindles, means associated with said mold plate operable to withdraw the spindles therein from the molded cover at a predetermined time after the withdrawal of the mold plate, and means associated with said last mentioned means operable to actuate the other set of spindles to eject the molded cover from the other mold plate after the first set of spindles has been withdrawn a predetermined distance.

7. In apparatus for molding battery box cover members having terminal post bushings therein initially provided with a protective web, complementary mold plates movable relatively with respect to each other, a set of bushing spindles slidably mounted in each of said mold plates, the spindles of one of said sets having a cutting edge, means operable to move the mold plates together for molding, means operable to vary the relative position of the sets of spindles with respect to the mold plates and each other to shear the protective webs from the bushings, means operable to withdraw one of the mold plates after completion of the molding operation, and means associated with said mold plate operable to maintain the spindles mounted therein in contact with the molded cover for a predetermined period during withdrawal of the mold plate.

8. In apparatus for molding battery box cover members having terminal post bushings therein initially provided with a protective web, complementary mold plates movable relatively with respect to each other, a set of bushing spindles slidably mounted in each of said mold plates, the spindles of one of said sets having a cutting edge, means operable to move the mold plates together for molding, means operable to vary the relative position of the sets of spindles with respect to the mold plates and each other to shear the protective webs from the bushings, means operable to withdraw one of the mold plates after completion of the molding operation, means associated with said mold plate operable to maintain the spindles mounted therein in contact with the molded cover for a predetermined period during withdrawal of the mold plate, and means operable to actuate the other set of spindles to eject the molded cover from the other mold plate.

9. In apparatus for molding battery box cover members having terminal post bushings therein initially provided with a protective web, complementary mold plates movable relatively with respect to each other, means operable to move said mold plates together for molding, means slidably mounted in each of the mold plates and cooperable to shear the protective webs from the bushings, and means operable to relatively separate said mold plates at the completion of a molding operation independently of said shearing means.

10. In apparatus for molding battery box cover members having terminal post bushings therein initially provided with a protective web, complementary mold plates movable relatively with respect to each other, means operable to move said mold plates together for molding, means slidably mounted in each of the mold plates and cooperable to shear the protective webs from the bushings, means operable to relatively separate said mold plates at the completion of a molding operation independently of said shearing means, and means associated with one of the mold plates operable to withdraw the shearing means mounted therein from the molded cover at a predetermined time after relative separation of said mold plates.

11. In apparatus for molding battery box cover members having terminal post bushings therein initially provided with a protective web, complementary mold plates movable relatively with respect to each other, means operable to move said mold plates together for molding, and means slidably mounted in each of the mold plates constructed and arranged to cooperate and shear the protective webs from the bushings before separation of said mold plates.

MILTON H. MARTINDELL.